(12) United States Patent
Hanson et al.

(10) Patent No.: US 11,999,252 B2
(45) Date of Patent: Jun. 4, 2024

(54) ROADWAY CHARGING COIL ALIGNMENT AND MONITORING

(71) Applicant: FORD GLOBAL TECHNOLOGIES, LLC, Dearborn, MI (US)

(72) Inventors: Ryan E. Hanson, Livonia, MI (US); John R. Van Wiemeersch, Novi, MI (US); Vivekanandh Elangovan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 393 days.

(21) Appl. No.: 17/579,860

(22) Filed: Jan. 20, 2022

(65) Prior Publication Data

US 2023/0226937 A1 Jul. 20, 2023

(51) Int. Cl.
*G01S 13/88* (2006.01)
*B60L 53/30* (2019.01)
*B60L 53/39* (2019.01)

(52) U.S. Cl.
CPC ............ *B60L 53/39* (2019.02); *B60L 53/305* (2019.02); *G01S 13/885* (2013.01); *B60L 2240/62* (2013.01); *B60L 2260/52* (2013.01); *B60L 2260/54* (2013.01)

(58) Field of Classification Search
CPC .... B60L 53/39; B60L 53/305; B60L 2240/62; B60L 2260/52; B60L 2260/54; B60L 9/00; B60L 3/12; B60L 5/005; B60L 53/12; B60L 53/124; B60L 53/126; B60L 53/36; B60L 53/38; G01S 13/885; G01S 2013/9316; G01S 13/0209; G01S 13/931; G01S 2013/93271; Y02T 10/70; Y02T 10/7072; Y02T 90/12; Y02T 90/14; H02J 50/10; H02J 50/90

See application file for complete search history.

(56) References Cited

U.S. PATENT DOCUMENTS

| | | |
|---|---|---|
| 6,879,889 B2 | 4/2005 | Ross |
| 8,949,024 B2 | 2/2015 | Stanley et al. |
| 10,320,923 B2 * | 6/2019 | Moghe ................... G08G 1/052 |

(Continued)

FOREIGN PATENT DOCUMENTS

| | | |
|---|---|---|
| DE | 102018211955 A1 | 8/2019 |
| GB | 2500691 A | 2/2013 |

*Primary Examiner* — Justin Holmes
(74) *Attorney, Agent, or Firm* — Frank L. Lollo; MacMillan, Sobanski & Todd, LLC

(57) ABSTRACT

An electric vehicle having an electrical storage battery includes an inductive charge receiver configured to inductively couple to a series of charging coils embedded in a roadway over which the vehicle travels in order to transfer charge to the storage battery. A ground penetrating radar transceiver is configured to interrogate the roadway including a region of the roadway toward which the vehicle is heading. The ground penetrating radar transceiver generates reflectance data including reflections from the charging coils and from embedded cabling coupling the charging coils. An object analyzer is responsive to the reflectance data and configured to map the series of charging coils relative to the vehicle. A path controller is configured to determine a steering operation of the vehicle along the roadway for optimizing a charge transfer from the series of charging coils to the inductive charge receiver.

18 Claims, 4 Drawing Sheets

(56) References Cited

U.S. PATENT DOCUMENTS

| | | |
|---|---|---|
| 10,814,736 B2 | 10/2020 | Van Wiemeersch et al. |
| 10,942,518 B2 | 3/2021 | Murad et al. |
| 11,021,074 B2 | 6/2021 | Moghe et al. |
| 2015/0246614 A1* | 9/2015 | Dames ................ B60M 3/04 191/10 |
| 2016/0046198 A1* | 2/2016 | Krammer ............ G05D 1/0246 701/22 |
| 2018/0038694 A1 | 2/2018 | Bruemmer et al. |
| 2018/0356833 A1* | 12/2018 | Öhman ............... G05D 1/0265 |
| 2021/0237716 A1* | 8/2021 | Prasad ................ H04N 23/90 |
| 2021/0242716 A1 | 8/2021 | Lee |

* cited by examiner

ROADWAY CHARGING COIL ALIGNMENT AND MONITORING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electric vehicle charging, and, more specifically, to maintaining vehicle alignment with charging coils embedded in a roadway for recharging a vehicle battery while traveling on the roadway.

Electrically-powered roadway transportation vehicles (e.g., fully electric and hybrid electric cars) include high capacity storage batteries which require routine charging. Wireless inductive charging can be used to avoid the need for connecting a hardwired cable when recharging the battery. For example, vehicle owners may be able to wirelessly charge their vehicles within their home garages using a setup having a transmitter pad located atop a floor in the garage and an inductive receiver mounted in the vehicle. Since charging efficiency depends on a good alignment of the inductive coils, one or more visual indicia may be provided to assist in proper positioning of the vehicle during charging. In order to simplify the parking of a vehicle in a proper alignment, radar and other sensors may also be used to locate a charging pad and to guide the vehicle into alignment (including autonomously parking the vehicle at the appropriate spot).

In order to reduce the need for a vehicle to be parked and idle during a charging operation, inductive charging apparatus can be embedded into sections of a roadway so that vehicles can be charged while traveling. Where visual markings or objects are used to demark the locations of embedded transmitter coils, a driver may maintain alignment with the coils manually or a camera or other sensor capable of detecting the markings can provide driver assistance actions to improve the alignment. Since markings may not always be available, it is also known to monitor the coupling factors for several laterally-spaced receiver coils mounted on a vehicle and to adjust the travel path of the vehicle based on differences between the coupling factors (e.g., so that the coupling factor of a main central receiver coil is maximized). However, this responds only to the immediate charging coil over which the vehicle is located and suffers from excessive alignment errors in curves. Irregularities in embedded coil spacing and the presence of damaged or inactive coils can further reduce the effectiveness of maintaining an optimal alignment.

SUMMARY OF THE INVENTION

In some embodiments, a ground penetrating radar in the form of an Ultra-Wide Band (UWB) radar transceiver is used to detect roadway-embedded charging coils and to plan a travel path relative to the detected coils for optimizing inductive charging. Characterization of the positions and condition of upcoming coils enables accurate estimation of charging rates and a means to inform a driver of a battery state of charge and/or driving range which can be obtained and/or to suggest moving to a different lane of the roadway when a different series of coils may provide better charging performance. Radar data can also be used to determine embedded coil integrity and to inform a maintenance organization in the event of damage to the embedded components.

In one aspect of the invention, a vehicle powered at least partly by an electrical storage battery comprises an inductive charge receiver configured to inductively couple to a series of charging coils embedded in a roadway over which the vehicle travels in order to transfer charge to the storage battery. A ground penetrating radar transceiver is configured to interrogate the roadway including a region of the roadway toward which the vehicle is heading. The ground penetrating radar transceiver generates reflectance data including reflections from the charging coils and from embedded cabling coupling the charging coils. An object analyzer is responsive to the reflectance data and configured to map the series of charging coils relative to the vehicle. A path controller is configured to determine a steering operation of the vehicle along the roadway for optimizing a charge transfer from the series of charging coils to the inductive charge receiver.

DETAILED DESCRIPTION OF PREFERRED EMBODIMENTS

Figure 1:
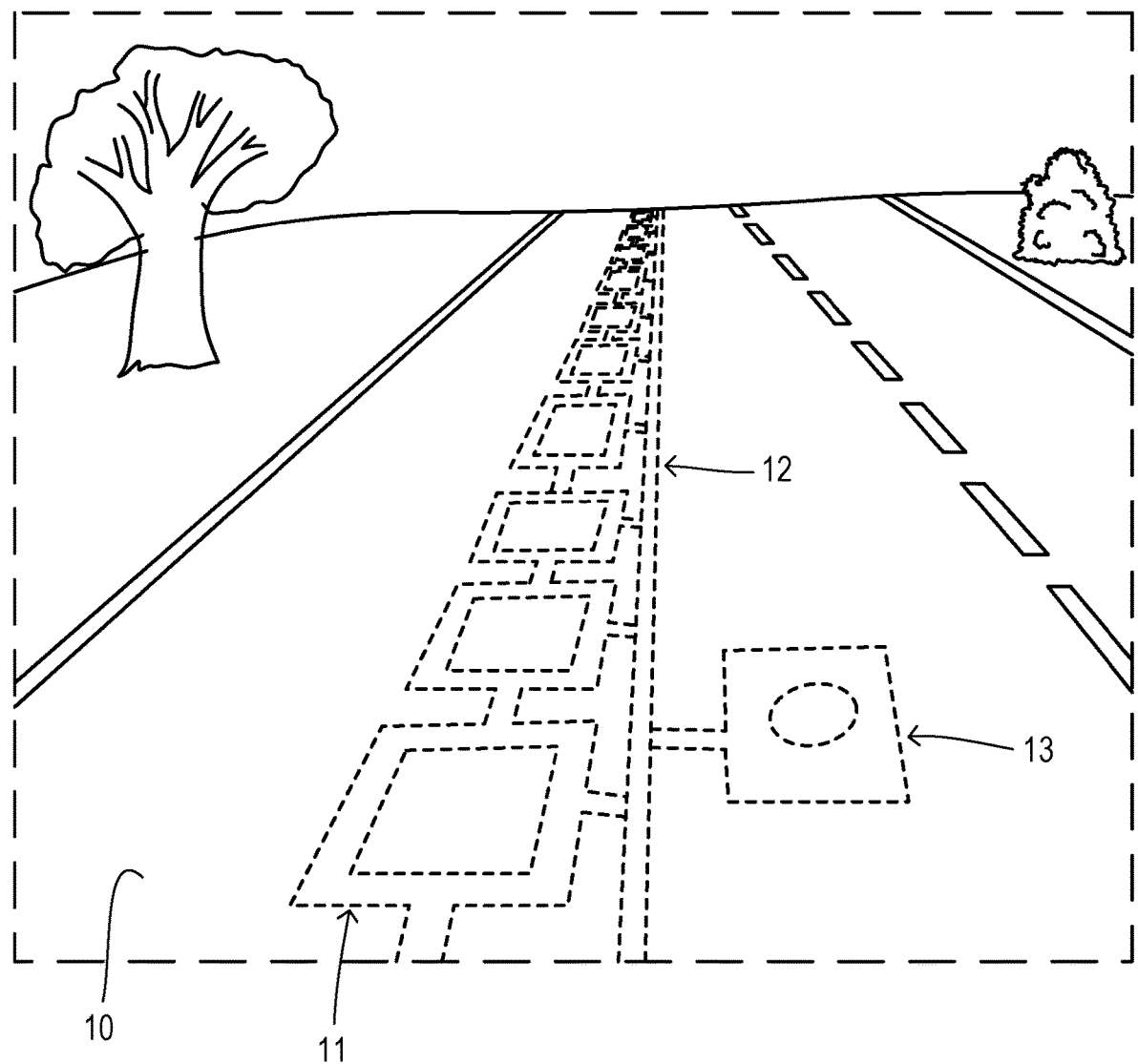
FIG. 1 is a schematic view of a roadway having embedded coils and cables for inductively charging vehicles passing over the roadway.

The invention optimizes inductive coupling between vehicle-mounted receiving coils and roadway-embedded transmission coils in order to maximize a vehicle charging rate while driving at speed on a roadway. Ground penetrating radar (preferably Ultra-Wide Band or UWB radar) detects and maps out the embedded charging coils so that a vehicle path can be laid out with the optimal charging capacity. A detection range of the radar extends beyond the charging coil presently beneath a vehicle, potentially beyond the next few coils in the travel direction of the vehicle. Since a UWB radar can identify the relative locations and actual configurations (e.g., type of) charging coils beneath the road surface, the steering of the vehicle can be adjusted in order to align the inductive coils more accurately as the vehicle continues to move along its lane of the roadway, thereby improving the coupling efficiency. Because a UWB radar is capable of detecting the actual coil locations both under and ahead of vehicle, the invention achieves a forward looking capability which enables the vehicle to follow a series of coils along the roadway path regardless of curves or uneven spacing of coils. Furthermore, the vehicle is able to maintain an optimal path at a great accuracy when one or more coils are encountered that are not outputting a charging field as a result of being inactive or damaged.

Steering adjustments can be obtained manually by providing driver assistance in the form of guidance instructions. For example, a user interface (human-machine interface of HMI) can display visual cues or instructions (e.g., left or right arrows on a Head Up Display), play audible cues or instructions, or generate haptic feedback (e.g., nudges on a steering wheel as used in lane-keeping assistance systems). Alternatively, handsfree and/or semi-automated driving modes can be activated to keep the vehicle aligned with the embedded charging system.

Use of UWB radar further provides an ability to determine the integrity of embedded charging coils or cables, and to determine whether charging coils are inactive or potentially damaged. The invention may further utilize the UWB radar to tabulate the size and number of charging coils to be traversed and their distances from one another, enabling the calculation of a predicted charging rate. Where more than one path (e.g., different lanes of a roadway) offer charging from embedded charging coils, relative charging rates can be compared and a recommended steering operation may include a lane change to access a better charging rate, for example.

In some embodiments, a UWB radar may be capable of detecting the constituent materials which makeup the charging coils through the roadway surface, regardless of whether the charging coil is active, damaged, or otherwise not working. The UWB radar may be aimed down and forward of the vehicle for the purpose of detecting the charging coils and/or other system components such as cables, connectors, vehicle sensors, controllers, power conditioners, or communication nodes located beneath the road surface. The radar operation can be successively adjusted for detecting the current coil beneath the vehicle, the next charging coil (i.e., the coil just forward of the current vehicle position), and more coils farther down the travel path in order to allow for better alignment of the vehicle's path to follow the layout of the charging coils. Provided a sufficiently high bandwidth UWB radar is used, abnormalities of (e.g., damage to) the charging coils or other embedded components of the charging system can be detected.

In some embodiments, the embedded charging coil has a UWB chipset which can support the additional use of Time of Flight data and Angle of Arrival data derived from radar pulses, to achieve better detection/localization of the transmitting coils. The added UWB functionalities can also support improved communication between a vehicle and charging systems for sharing the amount of electrical power which is consumed and for conducting payment transactions.

Using the mapped charging coil positions and type together with charging parameters associated with performance of charging coils in the series of coils which have already been traversed, an available charge density for a certain portion of a current route of the vehicle can be predicted, which yields an expected battery rate of charge. Using a current battery state of charge together with the expected rate of charge being received from each charging coil, and the detected distance between charging coils, a future battery state of charge can be determined. Thus, various kinds of predictions or charging scenarios can be presented to the driver. For example, the driver can be informed of the time that the vehicle may need to travel within the charging lane at the current rate of speed in order to reach a vehicle battery charge level of 80%, 100%, or some other selected charge level. Additionally, if a route and destination have been identified (e.g., by inputting into a navigation system), then the invention may examine the pre-programmed navigation route to determine a) how much charge may be necessary to complete a trip and b) how much charge may be gained and/or maintained by using identified charging sections of roadway along the route. The result allows the user to understand if they may need to stop at a charging station while in route in order to complete the trip. Further, it becomes possible to determine when it may be advantageous to stop at a charging station given the ability for the vehicle battery to recharge, e.g., based on the battery's ability to accept charge at different rates given its charge level and temperature, with enough reserve to ensure that the user and/or vehicle is not stranded due to an unforeseen charging station closure. Available charging rates and/or charging densities which differ between adjoining lanes can also be examined, allowing for the selection of an optimal lane by a vehicle controller. Moreover, the invention may utilize crowd sourced information, so that damaged and/or nonfunctional charging coils can be taken into consideration.

The optimization of charging can be performed across a group of various vehicles. For example, vehicles can provide their charge rates and their battery levels to other vehicles via a Cellular V2×system or by UWB communication (node to node), or any other wireless communication method. When two vehicles are in communication, they can negotiate for use of lanes (such that if a Vehicle A has a lower charge and is in a lane with a lower charge rate while a Vehicle B has a higher charge and is in a lane with a higher charge rate, then the vehicles can exchange lanes so that the charging would be more optimized between vehicles).

Referring to FIG. 1, a roadway 10 has embedded beneath is upper surface a series of charging coils 11, interconnecting cables 12, and support circuitry 13 (such as a power conditioner, service controller, and the like). The surface of roadway 10 may or may not provide any markings or indicia which identifies the location of charging coils 11. Power delivered to charging coils 11 via cables 12 is configured to inductively transfer electrical charge to receiving coils of electrified vehicles traveling on roadway 10 over coils 11.

Figure 2:
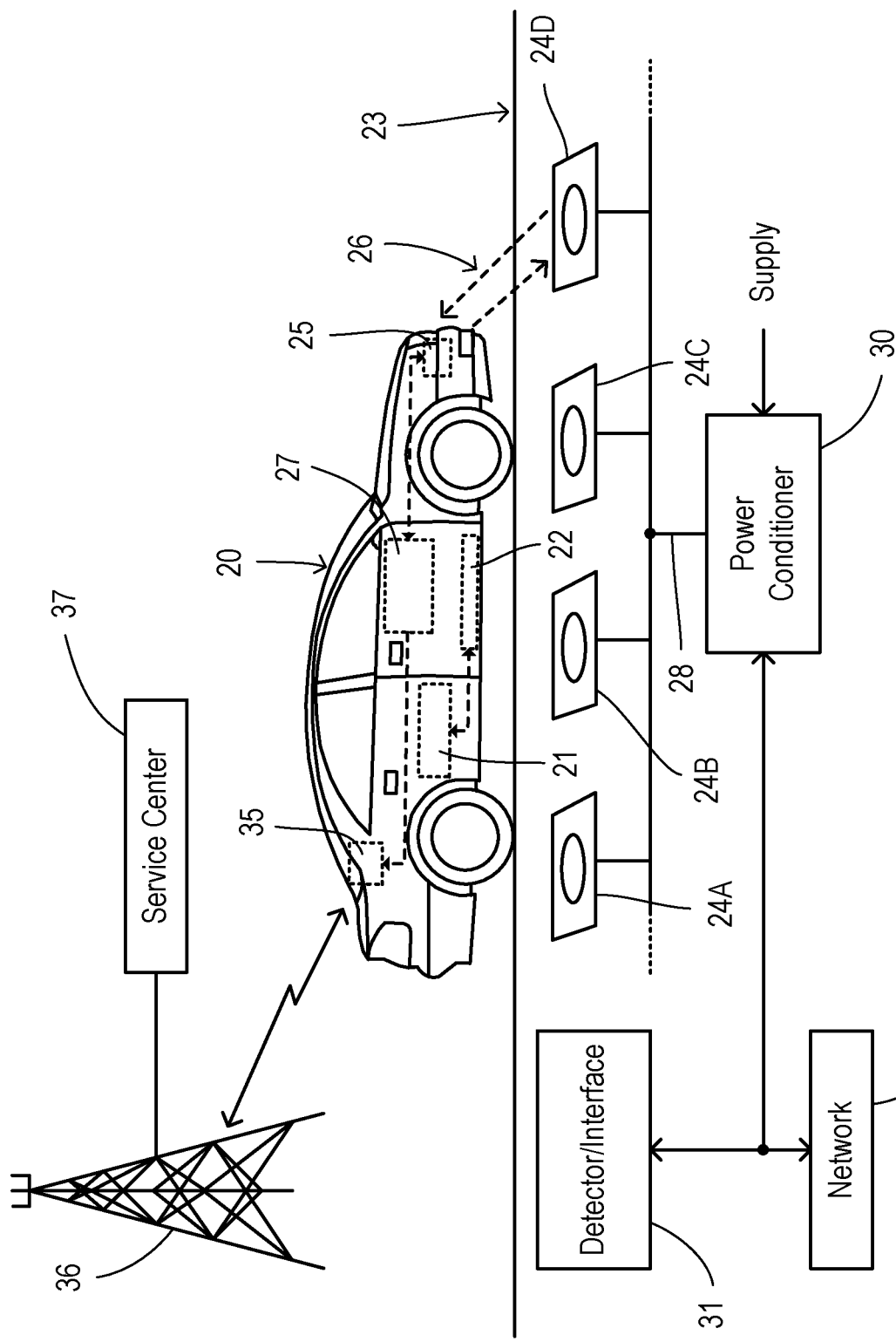
FIG. 2 is a schematic, block diagram showing a vehicle and infrastructure for providing a charging system.

FIG. 2 shows an electric vehicle 20 having an electrical storage battery 21 which can be inductively charged via an inductive charge receiver 22. Vehicle 20 travels on a roadway 23 containing a series of embedded charging coils including coils 24A, 24B, 24C, and 24D. The series of charging coils may typically be deployed along the center of a driving lane and extending for a sufficient distance for providing a useful amount of charge to a vehicle passing overhead. In order to remotely sense the location and structures of charging coils, a ground penetrating radar transceiver 25 on vehicle 20 is configured to interrogate roadway 23 with radar pulses 26 in a region of roadway 23 (e.g., the region toward which vehicle 20 is heading). In response to radar pulses 26, ground penetrating radar transceiver 25 generates reflectance data including reflections from charging coils 24A-24D and from embedded cables 28. Cables 28 couple charging coils 24A-24D to a power conditioner/controller 30 of a charging system which may further include a vehicle detector/interface 31 and a communication/payment network 32.

Detector/interface 31 and/or charging coils 24A-24D may include UWB components which provide enhanced functionality such as data transmission or localization signals. The localization signals can be adapted to provide time-of-flight (TOF) data and/or angle of incidence data as known in the art. Radar transceiver 25 acts as a localization receiver which is configured to utilize the localization signals to enhance accuracy of the radar-based detected positions of coils 24A-24D. The UWB communication signals can provide remote links or portions of links to be used in connection with messaging between vehicle 20 and the charging system, service center 37, and/or other electric vehicles on roadway 23 utilizing the charging system, for example.

The reflectance data gathered by radar 25 is provided to a control circuit 27 (e.g., a controller module comprised of a programmable microcontroller configured according to the embodiments described below). Using the reflectance data, control circuit 27 performs object/pattern recognition to find features delineating charging coils 24 and/or cables 28 in order to A) map locations of the series of charging coils 24 relative to vehicle 20, B) identify a configuration, type, or capacities of charging coils 24, and/or, C) identify damage to the charging coils and embedded cabling. Based on the mapped locations of charging coils 24, control circuit 27 then determines a steering operation for vehicle 20 along roadway 23 for optimizing a charge transfer from charging coils 24A-24D to inductive charge receiver 22.

Preferably, ground penetrating radar transceiver 25 may be comprised of a UWB radar having a sufficient resolution to reveal abnormalities in the condition of charging coils 24 or cables 28, wherein the abnormalities identify damage affecting the charging performance. When damage is detected, control circuit 27 may utilize a wireless data link 35 (e.g., a cellular unit) to transmit a maintenance message to a service center 37 via a cellular network 36, for example. A maintenance message can alternately be transmitted via interface 31 and network 32 when vehicle 20 is capable of UWB messaging or there is another wireless link to the embedding charging system. Based on detected aspects of charging coils 24A-24D or other elements of the embedded charging system, control circuit 27 may also generate status messages to be sent by link 35 to users of other vehicles to assist with their usage of the charging system.

Figure 3:
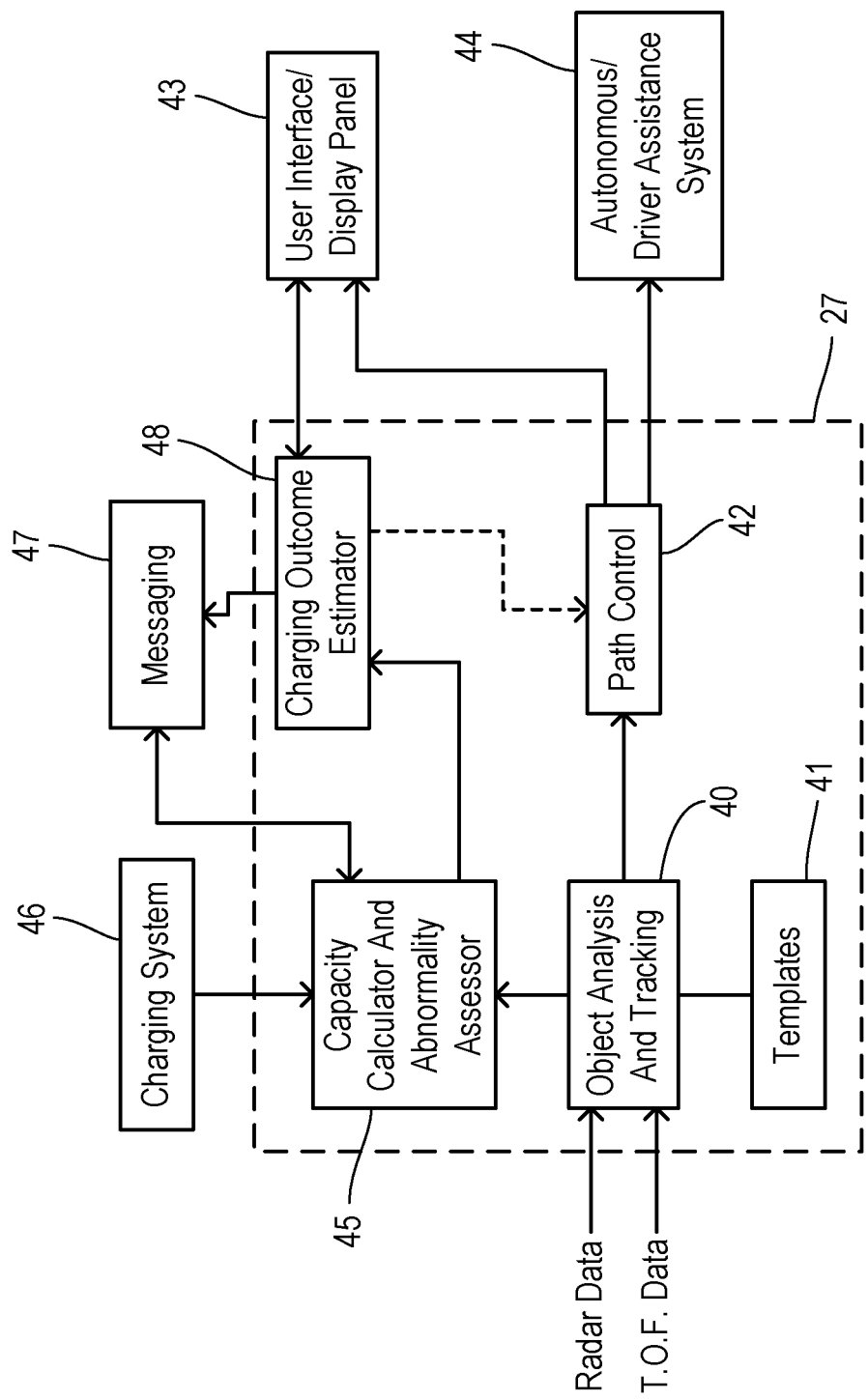
FIG. 3 is a block diagram showing components of a vehicle for optimizing inductive charging.

FIG. 3 shows control circuit 27 of vehicle 20 in greater detail. An object analysis and tracking block 40 receives the radar reflectance data, and optionally UWB-based time-of-flight and/or angle of incidence data (e.g., when both the vehicle and charging coils have UWB transceivers). Object analysis and tracking block 40 is coupled to a collection of templates 41 which preferably includes a plurality of charging coil templates for comparison with the reflectance data to identify the type (e.g. capacity) of charging coils, and a plurality of abnormality templates for comparison with the reflectance data to identify abnormalities and damage to the charging coils and embedded cabling. Templates 41 may correspond to various types of charging coils or other charging system components as would be seen in radar reflectance data from various different perspectives (e.g., distance and viewing angles). For specific types and/or sizes of charging coils, data may be stored in association with templates 41 which helps characterize the available charging rate that may be supported.

Object analysis and tracking block 40 provides the mapping of the upcoming charging coils to a path control block 42. A steering operation to be performed by the vehicle along the roadway is computed by path control block 42 such that the vehicle will follow a trajectory over the embedded charging coils which places the onboard inductive charge receiving coils in a preferred relationship with the embedded charge transmitting coils in order to optimize a charge transfer. The steering operation may be comprised of steering instructions to be presented to a driver for manual execution of a steering adjustment. Path control block 42 may be coupled to a user interface 43 for communicating the steering instructions. For example, user interface 43 may include a touchscreen display panel or indicator lights on an instrument panel which are lit to indicate a direction and magnitude of a steering correction. User interface 43 may also comprise a haptic feedback element for communicating a steering operation, e.g., using a steering wheel vibration to guide the driver along a desired pathway. In some embodiments, path control block 42 is coupled to an autonomous driver assistance device or system 44 which is configured to autonomously perform all or part of the steering operation. In some embodiments, a drive assistance system may be comprised of a fully autonomous vehicle control system or may be comprised of a lane keeping system of a partially autonomous vehicle.

Object analysis and tracking block 40 is further coupled to a capacity calculator and abnormality assessor block 45. Radar data, template matching results, a determination of a type of charging system, and/or corresponding specifications of the charging parameters of the detected charging coils/cables embedded in the roadway which have been determined by object analysis and tracking block 40 may be sent to block 45. Regarding any abnormalities (e.g., matches of radar data with abnormality templates), block 45 assesses the likelihood and/or significance of damage to the charging function. When a likely significance of damage to the embedded charging coils or cabling meets a predetermined threshold, block 45 activates a wireless messaging unit 47 to send a maintenance message to an entity which can initiate repairs or other responses (e.g., a service center).

Block 45 is coupled to a vehicle charging system 46 in order to obtain information on the current charging performance as the vehicle interacts with the embedded charging coils. Based on various factors such as (i) a characterization of the embedded coils in the series, (ii) the charging rate that is already being achieved with the coil series, and (iii) the current state of charge of the onboard storage battery, block 45 predicts a charge transfer rate that will be obtained as the vehicle continues to move atop the detected series of charging coils. The predicted charge transfer rate is coupled to a charging outcome estimator 48 for determining a potential future state of charge of the storage battery. Estimator 48 may utilize information relating to a current vehicle trip such as an intended destination and route (e.g., obtained from a GPS navigation system or from the driver via user interface 43) in order to evaluate whether sufficient battery capacity will be maintained to allow the vehicle to complete the trip as planned. Estimator 48 is coupled to user interface 43 in order to inform the driver about the future state of charge of the battery and any conclusions that can be drawn based on the available information defining the trip. For example, charging outcome estimator 48 may be configured to determine a projected travel range including an expected increase of range as a result of the estimated charging rate and time/distance that the charging coils will be available. Based on an intended travel destination, estimator 48 provides signals to user interface 43 in order to inform the user of whether a distance to the intended destination is within the projected travel range. Even if a particular trip has not been determined, useful information can be provided such as informing the user of a projected travel range at which the future state of charge is estimated to fall to a predetermined state of charge.

Figure 4:
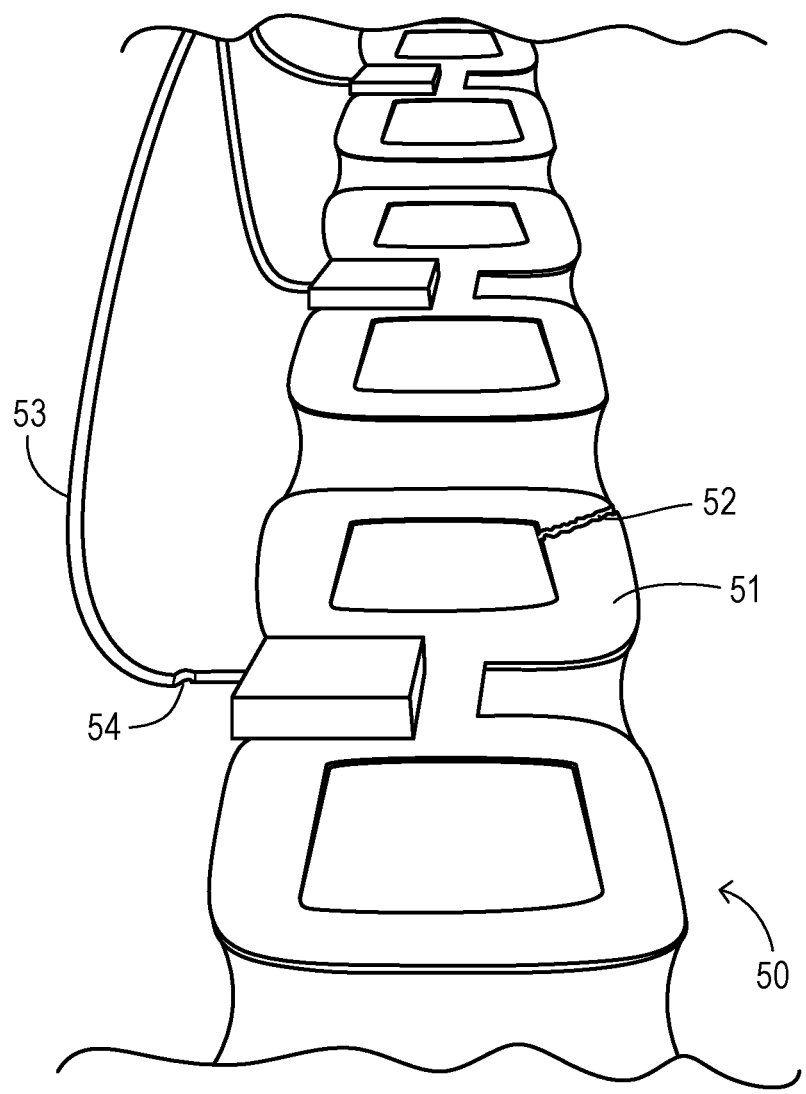
FIG. 4 is a schematic diagram of radar data revealing damage to embedded charging circuits.

FIG. 4 shows ground-penetrating radar reflectance data showing a series of charging coils 50 embedded in a roadway. Individual coils are represented by a repeating pattern which exhibits a changing size and perspective at increasing distances from the radar transceiver. Recognition of the series of coils is achievable since most of the embedded structures conform to their predetermined appearance. A coil 51 is shown with an abnormality 52 resulting from a discontinuity 52 which may be a bend or crack. A power supply cable 53 for driving coil 51 is shown with an abnormality 54 which may be a kink or break. In addition to, or instead of, predefined templates for identifying such abnormalities, machine learning and/or artificial intelligence can be used to detect and/or assess the actual damage, if any, associated with these and other abnormalities.

What is claimed is:

1. A vehicle powered at least partly by an electrical storage battery, comprising:
   an inductive charge receiver configured to inductively couple to a series of charging coils embedded in a roadway over which the vehicle travels in order to transfer charge to the storage battery;
   a ground penetrating radar transceiver configured to interrogate the roadway including a region of the roadway toward which the vehicle is heading, wherein the ground penetrating radar transceiver generates reflectance data including reflections from the charging coils and from embedded cabling coupling the charging coils;
   an object analyzer responsive to the reflectance data and configured to map the series of charging coils relative to the vehicle; and
   a path controller configured to determine a steering operation of the vehicle along the roadway for optimizing a charge transfer from the series of charging coils to the inductive charge receiver.

2. The vehicle of claim 1 wherein the object analyzer includes a plurality of coil templates for comparison with the reflectance data to identify the charging coils.

3. The vehicle of claim 2 wherein the object analyzer includes a plurality of abnormality templates for comparison with the reflectance data to identify damage to the charging coils and embedded cabling.

4. The vehicle of claim 3 further comprising a wireless messaging system for sending a maintenance message to a service center in response to an identification of the damage to the charging coils and embedded cabling.

5. The vehicle of claim 3 further comprising a wireless messaging system for sending a status message for informing users of other vehicles of a charging status of the series of charging coils.

6. The vehicle of claim 1 further comprising:
   a charge capacity calculator configured to predict a charge transfer rate based on an arrangement of the mapped series of charging coils;
   a charging outcome estimator configured to determine a potential future state of charge of the storage battery based on the predicted charge transfer rate; and
   a user interface configured to inform a user of the future state of charge.

7. The vehicle of claim 6 wherein the user interface is configured to inform the user of a projected travel range at which the future state of charge is estimated to fall to a predetermined state of charge.

8. The vehicle of claim 6 wherein the charging outcome estimator is configured to determine a projected travel range and an intended travel destination, and wherein the user interface is configured to inform the user of whether a distance to the intended destination is within the projected travel range.

9. The vehicle of claim 1 wherein the ground penetrating radar transceiver is comprised of an ultra-wide band (UWB) radar system.

10. The vehicle of claim 9 wherein the UWB radar system includes a messaging function for exchanging messages with a charging infrastructure which is connected to the series of charging coils.

11. The vehicle of claim 9 wherein the UWB radar system includes a localization receiver for evaluating a time of flight or a reception angle of an UWB signal radiating from a UWB transceiver in the series of charging coils.

12. The vehicle of claim 1 further comprising:
    a user interface configured to communicate the steering operation to a driver of the vehicle.

13. The vehicle of claim 1 further comprising:
    a driver assistance device configured to autonomously perform the steering operation.

14. A method of operating an electrified vehicle having a rechargeable storage battery, comprising the steps of:
    driving the vehicle on a roadway so that an inductive charge receiver in the vehicle inductively couples to a series of charging coils embedded in a roadway in order to transfer charge to the storage battery;
    interrogating the roadway using a ground penetrating radar transceiver directed toward a region of the roadway where the vehicle is heading, wherein the ground penetrating radar transceiver generates reflectance data including reflections from the charging coils and from embedded cabling coupling the charging coils;
    mapping the reflectance data;
    comparing the mapped reflectance data to a plurality of coil templates to delineate the series of charging coils relative to the vehicle; and
    determining a steering operation of the vehicle along the roadway for optimizing a charge transfer from the series of charging coils to the inductive charge receiver.

15. The method of claim 14 further comprising the steps of:
    comparing the reflectance data to a plurality of abnormality templates to identify damage to the charging coils or embedded cabling; and
    sending a maintenance message to a service center in response to an identification of the damage to the charging coils and embedded cabling.

16. The method of claim 14 further comprising the steps of:
    predicting a charge transfer rate based on an arrangement of the mapped series of charging coils;
    determining a potential future state of charge of the storage battery based on the predicted charge transfer rate; and
    informing a user of the future state of charge.

17. The method of claim 16 further comprising the step of:
    informing the user of a projected travel range at which the future state of charge is estimated to fall to a predetermined state of charge.

18. The method of claim 16 further comprising the steps of:
    determining a projected travel range and an intended travel destination; and
    informing the user of whether a distance to the intended destination is within the projected travel range.

* * * * *